(12) United States Patent
Waltermann et al.

(10) Patent No.: US 9,537,987 B2
(45) Date of Patent: Jan. 3, 2017

(54) TRANSMISSION OF DATA PERTAINING TO USE OF SPEAKER PHONE FUNCTION AND PEOPLE PRESENT DURING TELEPHONIC COMMUNICATION

(71) Applicant: LENOVO (SINGAPORE) PTE. LTD., New Tech Park (SG)

(72) Inventors: Rod David Waltermann, Rougemont, NC (US); Arnold S. Weksler, Raleigh, NC (US); Russell Speight Vanblon, Raleigh, NC (US); Nathan J. Peterson, Durham, NC (US); John Carl Mese, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/549,992

(22) Filed: Nov. 21, 2014

(65) Prior Publication Data

US 2016/0150065 A1 May 26, 2016

(51) Int. Cl.
*H04M 1/60* (2006.01)
*H04M 1/725* (2006.01)

(52) U.S. Cl.
CPC ....... *H04M 1/6041* (2013.01); *H04M 1/72519* (2013.01); *H04M 1/6075* (2013.01); *H04M 2250/12* (2013.01)

(58) Field of Classification Search
CPC combination set(s) only.
See application file for complete search history.

(56) References Cited

U.S. PATENT DOCUMENTS

| 9,031,762 | B1* | 5/2015 | Bell | G06F 17/00 345/173 |
| 9,100,694 | B1* | 8/2015 | Chandel | H04N 21/44218 |
| 2005/0177929 | A1* | 8/2005 | Greenwald | A42B 3/046 2/425 |
| 2010/0020951 | A1* | 1/2010 | Basart | H04M 15/06 379/142.01 |
| 2010/0273522 | A1* | 10/2010 | Ota | H04R 3/00 455/550.1 |
| 2014/0278896 | A1* | 9/2014 | Anand | G06Q 30/0246 705/14.32 |
| 2015/0235161 | A1* | 8/2015 | Azar | G06Q 10/06311 705/7.15 |

OTHER PUBLICATIONS

Wikipedia, "Acoustic Location" definition printed from website Sep. 23, 2014.

* cited by examiner

*Primary Examiner* — Junpeng Chen
(74) *Attorney, Agent, or Firm* — John L. Rogitz; John M. Rogitz

(57) ABSTRACT

In one aspect, a first device includes a processor and a memory accessible to the processor. The memory bears instructions executable by the processor to determine at least one of whether the first device is facilitating a telephonic communication with a second device at least in part using a speaker phone feature, and that plural individuals are within a proximity to the first device during the telephonic communication. The instructions are also executable to transmit to the second device data pertaining to at least one of the use of the speaker phone feature and the existence of plural individuals.

20 Claims, 6 Drawing Sheets

TRANSMISSION OF DATA PERTAINING TO USE OF SPEAKER PHONE FUNCTION AND PEOPLE PRESENT DURING TELEPHONIC COMMUNICATION

FIELD

The present application relates generally to transmission of data pertaining to use of a speaker phone function and/or people present during a telephonic communication.

BACKGROUND

When a person receives a telephone call, it is often difficult if not impossible to ascertain whom else besides the caller may be listening to all or part of the conversation on the caller's end of the line unless the caller verbally tells the person. This can be disconcerting and evoke privacy concerns.

SUMMARY

Accordingly, in one aspect a first device includes a processor and a memory accessible to the processor. The memory bears instructions executable by the processor to determine that plural individuals are within a proximity to the first device, and transmit, to a second device, with which the first device is facilitating a telephonic communication, data at least comprising information pertaining to the existence of plural individuals within the proximity.

In another aspect, a method includes determining whether a first device is facilitating a telephonic communication with a second device at least in part using a speaker phone feature, and in response to a determination that the first device is facilitating the telephonic communication at least in part using the speaker phone feature, transmitting data pertaining to the use of the speaker phone feature to the second device.

In still another aspect, a first device includes a processor, a display accessible to the processor, and a memory accessible to the processor. The memory bears instructions executable by the processor to engage in a telephonic communication with a second device different from the first device, and provide a notification at the first device that the second device is using a speaker phone function to at least partially conduct the telephonic communication.

The details of present principles, both as to their structure and operation, can best be understood in reference to the accompanying drawings, in which like reference numerals refer to like parts, and in which:

DETAILED DESCRIPTION

Figure 1:
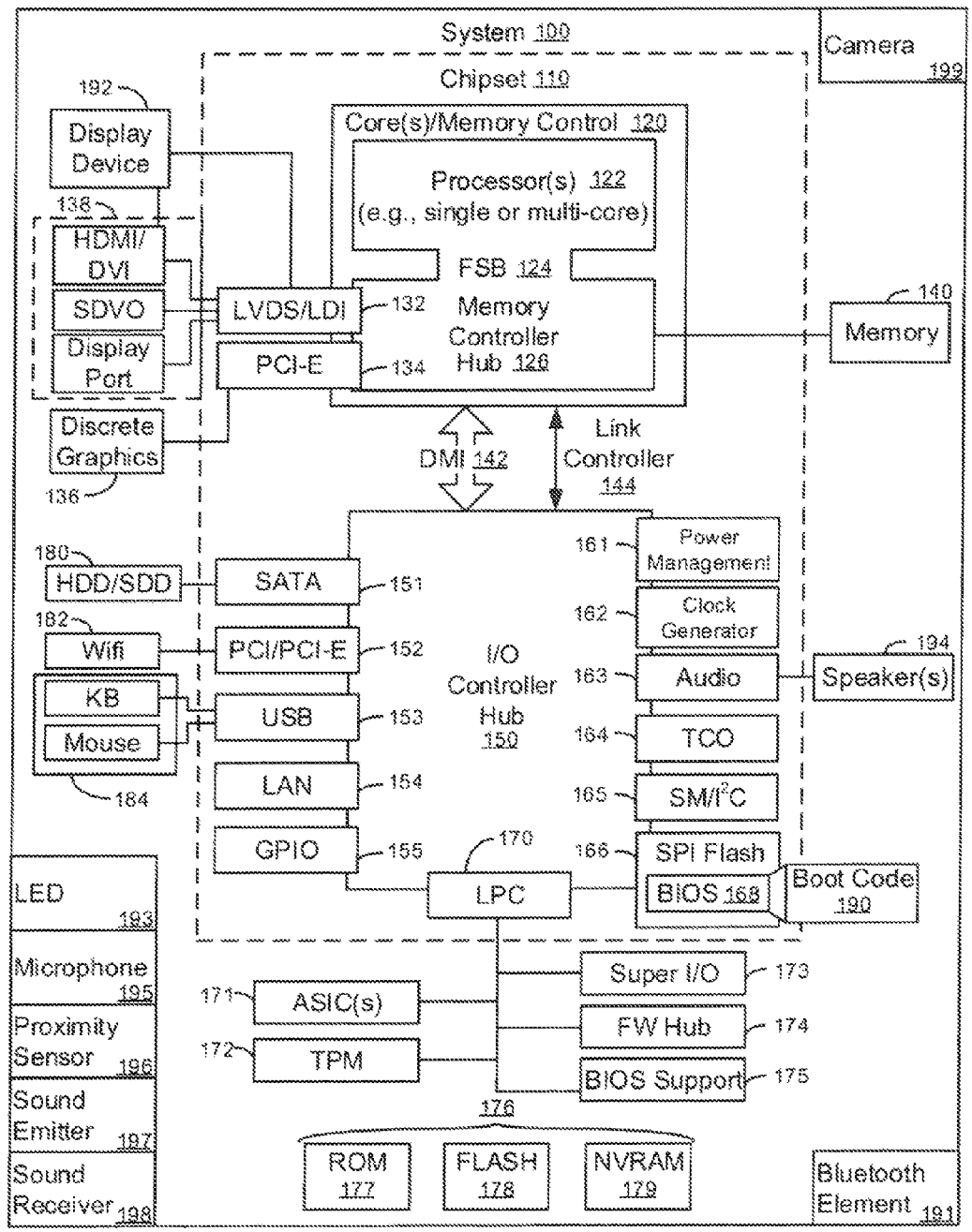
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital, signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of How charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received, and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computes system, such as one of the ThinkCentre® or ThinkPad® series of personal computers sold by Lenovo (US) Inc. of Morrisville, N.C., or a workstation computer, such as the ThinkStation®, which, are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control, group 120 and an I/O controller hub 150 that exchange information (e.g., data, signals, commands, etc.) via, for example, a direct management interface or direct media interface (DMT) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller huh 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interlace (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller ISO includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network, interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller ISO may include integrated gigabit. Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be earner waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Also shown is at least one light 193 which may be e.g. a light emitting diode (LED). It is to be understood that the light 193 may be positioned at least partially on a portion of a housing of the system 100 that does not form part of the display device 192, and/or may be positioned on a portion of the display device 192 such as e.g. a generally-blackened periphery of the display device 192 not configured to present images, user interfaces, application, windows, etc. It is to be further understood that the at least one light 193 may be configured to change colors emitted therefrom under control of the processor 122 such as e.g. being configured to emit green light, orange light, blue light, red light, and/or yellow light. Notwithstanding, it is to be understood that in some embodiments the at least one light 193 may be plural lights each being respectively configured to emit light of a different color such as e.g. green light, orange light, blue light, red light, and yellow light.

The system 100 of FIG. 1 may also include an audio receiver/microphone 195 providing input to the processor 122 e.g. based on a user providing audible input to the microphone, as well as a proximity, motion, infrared, sonar, and/or heat sensor 196 providing input to the processor 122 and configured in accordance with present principles for sensing e.g. proximity of one or more persons (e.g. to the system 100), motion of one or more persons, body heat of one or more persons, etc. Still further, the system 100 may include a sound emitter 197 configured to emit sound e.g. detectable by a sound receiver 198 to e.g. execute active or passive echo detection in accordance with present principles. Note that the sound receiver 198 may also used to identify sound distortions) in accordance with present principles.

Still in reference to the system 100 of FIG. 1, it may also include a camera 199 for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video of one or more people in accordance with present principles. Also shown is a Bluetooth element 191 configured for communication with other devices including other Bluetooth-enabled devices and/or Bluetooth beacons using Bluetooth communication standards. Thus, the Bluetooth element 191 may be implemented as a Bluetooth Low Energy (BLE) module and/or a Bluetooth 4.0 module that transmits data using one or more of BLE communication and/or standard Bluetooth communication.

Additionally, though now shown for clarity, in some embodiments the system 100 may include a gyroscope for e.g. sensing and/or measuring the orientation of the system 100 and providing input related thereto to the processor 122, and an accelerometer for e.g. sensing acceleration and/or movement of the system 100 and providing input related thereto to the processor 122. Still further, and also not shown for clarity, the system 500 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
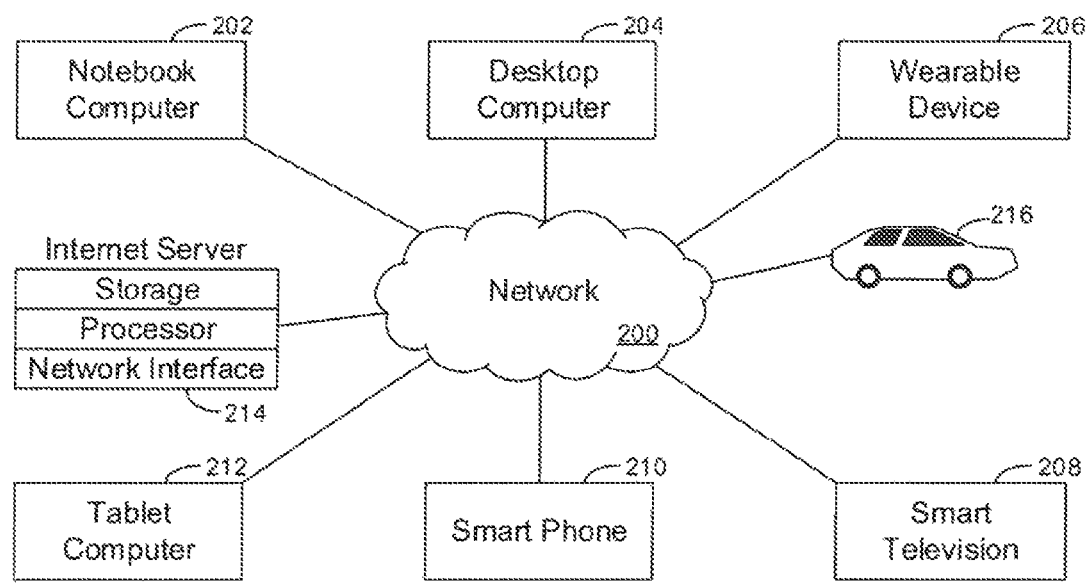
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a vehicle 216. The vehicle 216 may comprise some or all of the components discussed above with respect to the system 100, and furthermore may include e.g. a passenger sensor for sensing whether a passenger is positioned in a passenger seat, a passenger airbag sensor for sensing whether a passenger airbag has been enabled, a passenger seatbelt sensor for sensing whether a passenger seat belt has been engaged, a weight sensor for sensing weight of the vehicle 216 and weight distribution of the vehicle 216, etc.

In addition to the foregoing, the network 200 includes a server 214 such as e.g. an Internet server that may e.g. provide cloud storage accessible to the devices 202-212 and 216. It is to be understood that the devices 202-216 are configured to communicate with each other over the network 200 to undertake present principles.

Figure 3:
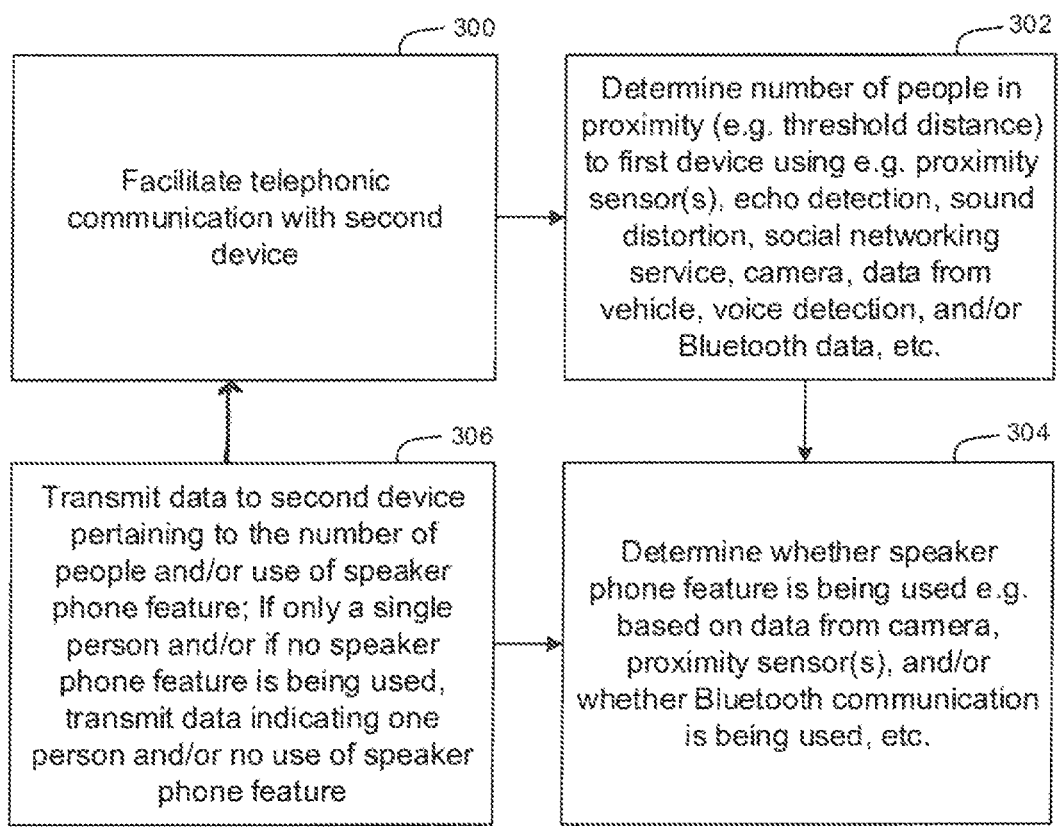
FIGS. 3 and 4 are flow charts showing example algorithms in accordance with present principles.

Referring to FIG. 3, it shows example logic that may be undertaken by a device, such as the system 100, in accordance with present principles. The device undertaking the logic of FIG. 3 will be referred to in reference to both FIGS. 3 and 4 as the "first device." Beginning at block 300, the logic facilitates a telephonic communication with a second device e.g. but not with additional devices such as in a conference-call setting, though it is to be understood that in other embodiments present principles may be undertaken in such a setting. Facilitating a telephonic communication may include but is not limited to e.g. initiating the telephonic conversation (e.g. using a telephone application on the first device) either by initiating the call itself or receiving the call from the second device, as well as continuing to facilitate the telephonic communication subsequent its initiation.

After block 300 the logic moves to block 302, at which the logic determines a number of people within a proximity to the first device (e.g. a threshold distance that is detectable using one or more of the methods and/or devices described below, and/or a threshold distance established by a user of the first device such as by way of a settings user interface (UI) like the UI 700 to be described below). The number of people may be determined at block 302 by various methods, including but not limited to using one or more proximity sensors for sensing the proximity and/or presence of a person (e.g. such as those described above), using echo detection, using sound distortion recognition, using data from a social networking service, using data from a camera in communication with the first device (e.g. to thus detect the number of people based on facial recognition), using data from a vehicle in which the first device is disposed (or is at least proximate) and with which the first device communicates, using voice detection (e.g. detecting distinct voices using a microphone in communication with the first device), and/or using Bluetooth data received at the first device (e.g. detecting Bluetooth (e.g. presence) signals that are being emitted from different devices and/or counting or tabulating the number of Bluetooth devices that are detectable at the first device (e.g. within range) and/or within the proximity to the first device).

Describing the afore-mentioned echo detection in greater detail, various types may be used, including active or passive (e.g. active acoustic location or passive acoustic location). For active echo detection, e.g. the trust device may emit sound (e.g. and/or vibrations) via a sound emitter such as the one described above, ascertain using echoes of the sound and/or vibrations that are detected the dimensions and/or characteristics of the surroundings in which the first device is disposed e.g. absent any people being present within the surroundings (e.g. within the proximity) and/or absent more than one person being present within the surroundings, save data pertaining to the dimensions and characteristics, and at a later time such as during the telephonic communication again emit sound and/or vibrations to determine any changes to the dimensions and/or characteristics compared to the saved ones, and thus determine the number of people present within the surroundings based on e.g. the location and number of changes. For passive echo detection many of the same principles may be used save for rather than emitting sound and/or vibrations, the first device may instead gather sound and/or vibrations from other sources (e.g. the people themselves) at various times to ascertain such changes.

Describing the afore-mentioned sound distortion in greater detail, dimensions of the first device's surroundings (e.g. within the proximity) may be determined, and/or more specifically the sound absorption properties of the surroundings may be determined (e.g. of particular items therein). Once a person is present in such surroundings, the person's body absorbs sound and hence changes the sound characteristics of the surroundings, which may be detected using sound distortion principles and/or devices to thus determine (e.g. or at least approximate) a number of people in the room.

Data from a social networking service that may be used includes e.g. status updates from which location and/or contextual information may be derived, as well as actual indications of location for the person. It is to thus be understood that the first device has been configured to access the social networking service as well as specifically e.g. a friends database of the user associated with the first device.

Data from a vehicle that may be used includes data pertaining to whether a passenger airbag has been enabled (e.g. in addition to a driver airbag to thus determine at least that there are plural people within the proximity), data pertaining to whether a passenger seatbelt has been engaged (e.g. in addition to a driver seatbelt to thus determine at least that there are plural people within the proximity), data pertaining to detection at a passenger seat of a passenger (e.g. using a seat and/or weight sensor to thus determine that in addition to sensing a driver using a seat sensor in the driver's seat at least that there are plural people within the proximity based on sensing a passenger in a passenger seat), data gathered by a camera of the vehicle (e.g. to thus perform facial recognition on images gathered by the camera to identify and determine a number of people), date pertaining to a current weight of the vehicle (e.g. comparing a weight of the vehicle with no people or only a single person in it to a greater weight which may be determined to be indicative of there being plural people in the vehicle), data pertaining to changes in horsepower demands on the vehicle and hence that more weight and thus more people are likely disposed in the vehicle, and/or data pertaining to a current weight distribution of the vehicle (e.g. comparing a weight distribution of the vehicle with no people or only a single person in it to a different weight distribution which may be determined to be indicative of there being plural people in the vehicle).

Still in reference to FIG. 3, after block 302 the logic proceeds to block 304, where the logic determines whether a speaker phone feature and/or function is being used at the first device to facilitate the telephonic communication. The determination at block 304 may be based on e.g. data from a camera (e.g. to detect whether the user of the first device has the first device near their head and specifically their ear or whether they have positioned the first device a distance away and/or in front of another body part such as the user's mouth), data from a proximity sensor(s) such as a heat sensor at or near the display of the first device to detect whether the first device has been positioned against a person's cheek or farther away from their body), data identified and/or determined using echo detection and/or sound distortion (e.g. to identify the device as being proximate to a user's cheek and hence not currently using a speaker phone feature), and/or whether Bluetooth communication is being used by the first device e.g. in conjunction with the telephonic communication. For example, if the use of Bluetooth communication is detected such as when the first device is in a vehicle, the first device may determine that a speaker phone feature is being used owing to the use of Bluetooth communication to transmit and receive audio of the telephonic communication between the first device and vehicle (e.g. when vehicle speakers and/or a vehicle microphone are being actuated to facilitate the telephonic communication and the vehicle transmits data correspondingly to the first device to then be transmitted by the first device to the second device).

In any case, after block 304 the logic proceeds to block 306, where the logic transmits data to the second device pertaining to the number of people within the proximity of the first device and/or the use of a speaker phone feature. Optionally, also at block 306 the logic may transmit data indicating that only a single person is within the proximity and/or data indicating that a speaker phone feature is not being used, if such is determined when undertaking the logic of FIG. 3. Also, note that after block 306 the logic may revert to block 300 and proceed therefrom e.g. to continue monitoring during the telephonic communication for people within the proximity and/or the use of a speaker phone feature at the first device.

Figure 4:
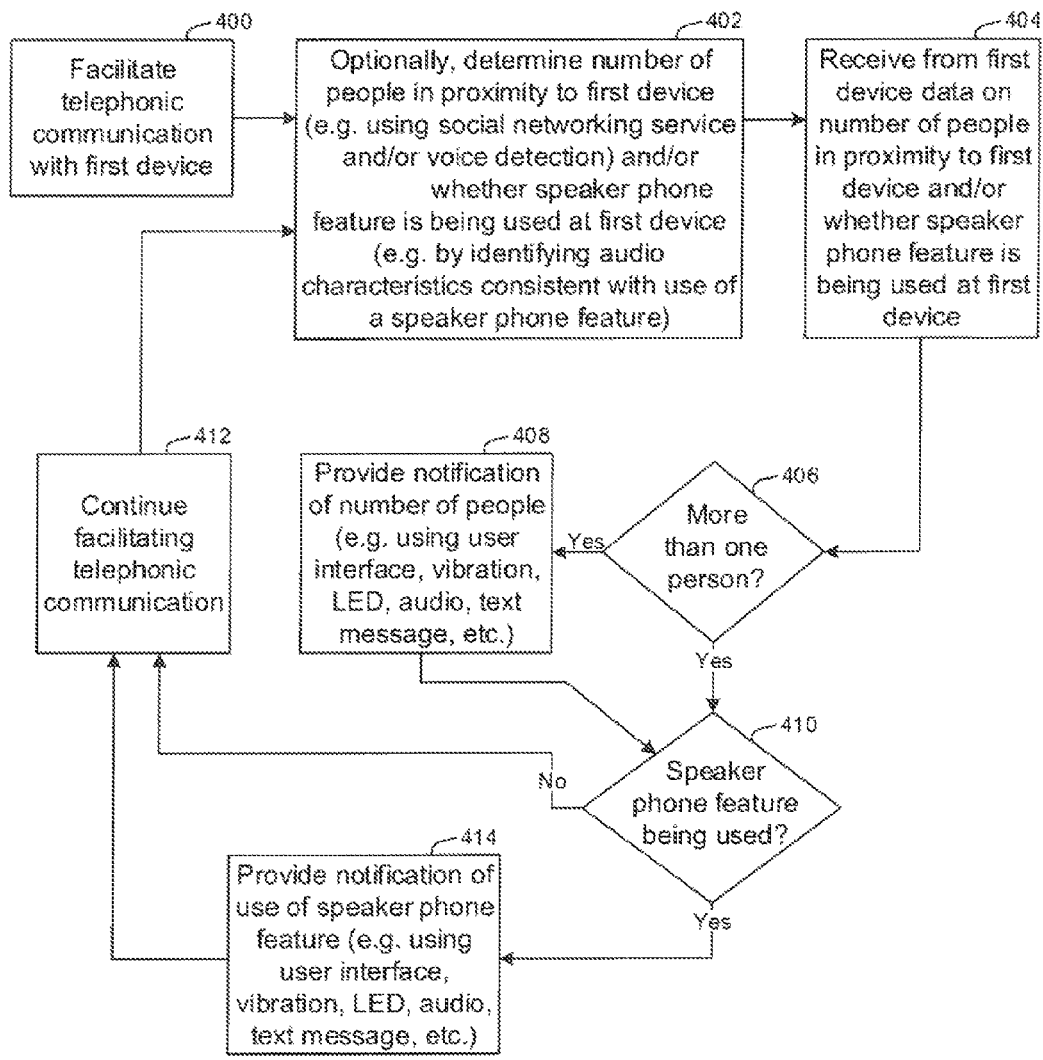

Now describing FIG. 4, it shows example logic that may be undertaken by a device, such as the system 100, in accordance with present principles. The device undertaking the logic of FIG. 4 will be referred to below as the "second device" and may be similar to the "second device" of FIG. 3 described above, though it is to be understood that a device facilitating a telephonic communication in accordance with present principles may (e.g. concurrently) undertake the logic of both FIGS. 3 and 4.

Beginning the description of FIG. 4 at block 400, the logic facilitates a telephonic communication with a first device (e.g. the "first device" of FIG. 3) in accordance with present principles e.g. but not with additional devices such as in a conference-call setting, though it is to be understood that in other embodiments present principles may be undertaken in such a setting. In any case, after block 400 the logic proceeds to block 402 where the logic may determine a number of people within a proximity (e.g. established by the user of the second device and/or a user of the first device) to the first device and/or whether a speaker phone feature is being used at the first device.

The determination of the number of people at block 402 may be made by the second device e.g. using a social networking service to identify e.g. the location of devices of friends of the user of the first device and whether the friends based on their respective device locations are within the proximity (e.g. similar to the social networking process described above in reference to FIG. 3, mutatis mutandis). The determination, of the number of people at block 402 may also be made by the second device e.g. by processing audio of the telephonic communication using voice detection software to identify plural different voices on the first device's end of the telephonic communication (e.g. even voices detectable but "in the background" and not actively participating in the conversation of the telephonic communication) and hence a number of people based on the number of distinct voices.

Also, note that the determination at block 402 of whether a speaker phone feature is being used may in some embodiments be made by the second device e.g. by identifying audio characteristics in the audio of the telephonic communication that are consistent with the use of a speaker phone feature on the other end of the line (e.g. an echo effect identified in the audio from the first device).

After block 402, the logic proceeds to block 404. At block 404 the logic receives from the first device data pertaining to a number of people in proximity to the first device and/or whether a speaker phone feature is being used at the first device. Such data may have been determined by the first device e.g. as set forth above with respect to FIG. 3. After block 404 the logic proceeds to decision diamond 406, where the logic determines based on either or both of e.g. the determinations at block 402 and/or data received at block 404 whether one or snore people are within the proximity to the first device. A negative determination at diamond 406 causes the logic to proceed to decision diamond 410, which will be described shortly. However, first note that an affirmative determination at diamond 406 first causes the logic to proceed to block 408. At block 408 the logic provides a notification(s) at least at the second device (e.g. and even at a vehicle (e.g. vehicle display) in which the second device is disposed and is communicating with) pertaining to the number of people (e.g. either a specific number and/or that at least plural people are within the proximity to the first device). Types of notifications such as the ones that may be presented at block 408 will be described further below. Regardless, from block 408 the logic may proceed to decision diamond 410, it being understood that a negative determination at diamond 406 may also cause the logic to proceed from diamond 406 directly to diamond 410.

At diamond 410 the logic determines based on either or both of e.g. the determinations at block 402 and/or data received at block 404 whether a speaker phone feature is being used at the first device to participate in the telephonic communication. A negative determination at diamond 410 causes the logic to proceed to block 412, where the logic may continue facilitating the telephonic communication and then move to block 402 to continue, during the telephonic communication, determining the number of people within the proximity of the first device and/or whether a speaker phone function is being used thereat. However, an affirmative determination causes the logic to move from diamond 410 to block 414, where the logic provides a notification at least at the second device of the use of a speaker phone feature at the first device. After block 414 the logic may proceed to block 412.

Describing the notifications that may be provided in accordance with present principles such as e.g. at blocks 408 and 414 described above, they may include a visual notification such as e.g. an alert presented on a display of the second device, a vibration at the second device using a vibration element of the second device (e.g. a specific and/or user-defined vibration pattern and/or length), actuating a light on the second device such as a light emitting diode (LED) (e.g. in a specific and/or user-defined color and/or in a specific and/or user-defined pattern), providing an audible tone (e.g. a specific and/or user-defined tone, tone length, and/or tone pattern) and/or words (e.g. a computerized voice), and/or a text message or email message. Notwithstanding, it is to be understood that still other notifications may be used in accordance with present principles.

Figure 5:
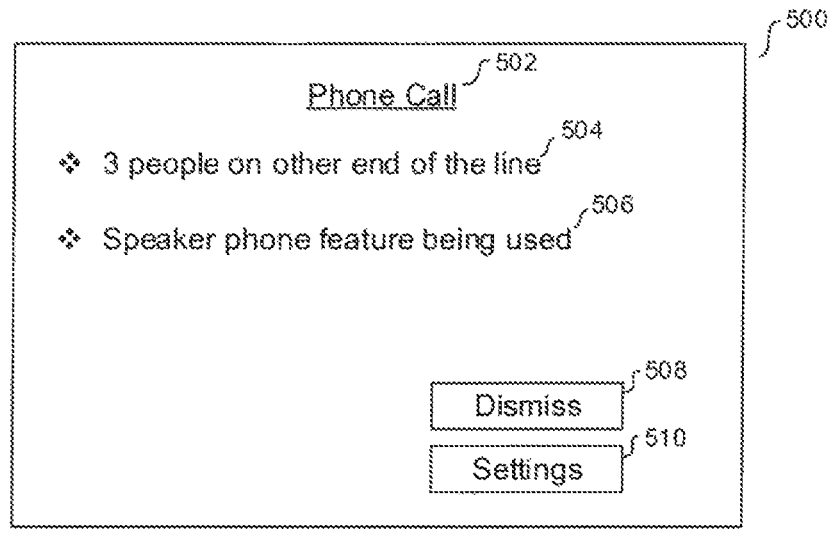
FIGS. 5-7 show example user interfaces (UI) in accordance with present principles.

Continuing the detailed description in reference to FIG. 5, an example user interface (UI) 500 is shown that is presentable on a display of a device undertaking present principles for providing a notification of at least one of a number of people within a proximity to another device with which the device presenting the UI 500 is engaged in a telephonic communication and/or whether the other device is using a speaker phone feature to facilitate in the telephonic communication. As may be appreciated from FIG. 5, the UI 500 includes an indication 502 that a telephonic communication is currently being facilitated at the device presenting the UI 500 (referred to below as the "present device" for simplicity).

The UI 500 also includes a notification 504 of a number of people determined to be present within a proximity of the other device with which the present device is engaging in the telephonic communication (in the present instance, three people which in some embodiments includes the person participating in the telephonic communication using the other device). A notification 506 is also shown, which indicates in the present example that a speaker phone feature is being used by the other device to facilitate the telephonic communication.

Additionally, note that the UI 500 includes a dismiss selector element 508 which is selectable to automatically without further user input dismiss the UI 500 from presentation on a display on which it is presented, as well as a settings selector element 510 which is selectable to automatically without further user input cause a settings UI to be presented for configuring settings associated with a telephone application undertaking present principles and/or for configuring settings associated with the notifications (e.g. the notifications 504 and 506) described herein. An example of such a settings UI will be described below in reference to FIG. 7.

Figure 6:
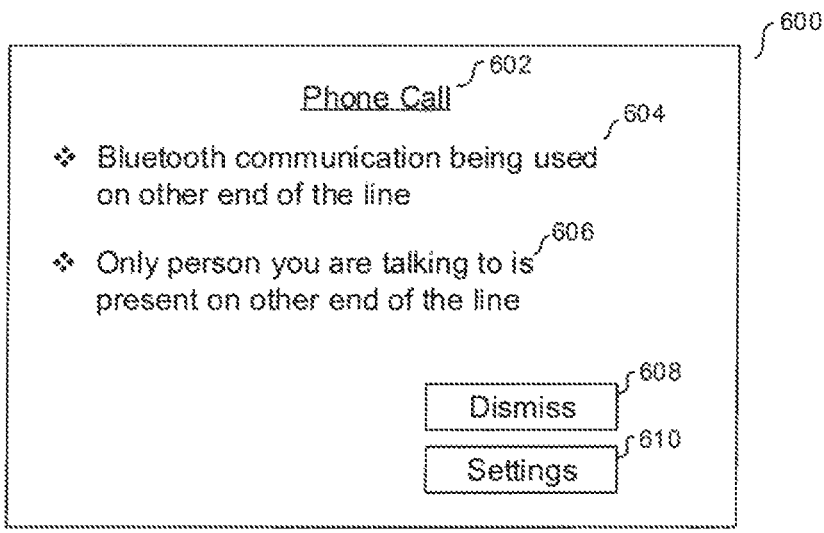

Moving on in the detailed description to FIG. 6, another example user interface (UI) 600 is shown that is presentable on a display of a device undertaking present principles for providing a notification of at least one of a number of people within a proximity to another device with which the device presenting the UI 600 is engaged in a telephonic communication and/or whether the other device is using a speaker phone feature to facilitate in the telephonic communication. As may be appreciated from FIG. 6, the UI 600 includes an indication 602 that a telephonic communication is currently being facilitated at the device presenting the UI 600 (referred to below as the "present device" for simplicity).

The UI 600 also includes a notification 604 indicating that Bluetooth communication and/or a Bluetooth communication element is being used by the other device to facilitate the telephonic communication. This may be the case when e.g. the other device is not itself employing a speaker phone feature but is nonetheless communicating over a Bluetooth communication channel With e.g. a vehicle employing a speaker phone feature for the other device to engage in the telephonic communication with the present device using the other device and the vehicle's speaker phone feature. A notification 606 is also shown, which indicates in the present example that only the person with whom the user is communicating is present within the proximity to the other device.

Additionally, note that the UI 600 includes a dismiss selector element 608 which is selectable to automatically without further user input dismiss the UI 600 from presentation on a display on which it is presented, as well as a settings selector element 610 which is selectable to automatically without further user input cause a settings UI to be presented for configuring settings associated with a telephone application undertaking present principles and/or for configuring settings associated with the notifications (e.g. the notifications 604 and 606) described herein.

Figure 7:
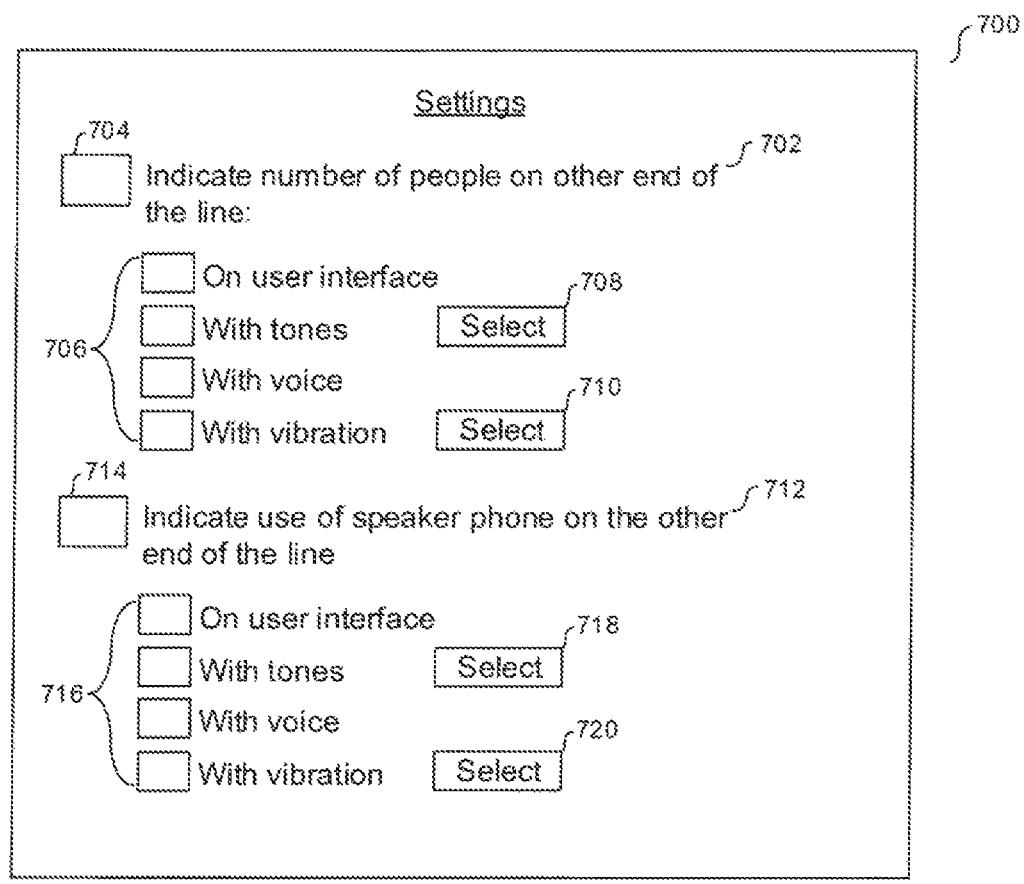

An example of such a settings UI is shown in FIG. 7. A UI 700 is shown, and it includes a first setting 702 pertaining to whether to configure the device presenting the UI 700 (referred to below as the "present device") to provide notifications indicating a number of people proximate to another device with which the present device is engaging in a telephonic communication in accordance with present principles. A check box 704 is shown, which is selectable to configure the device to provide such notifications and is also un-selectable once selected configure the device to not provide such notifications. Check boxes 706 are also shown which are respectively associated with types of notifications indicating the number of people that may be presented at the present device, including e.g. a visual notification on a user interface, an audible notification using a tone, an audible notification using an e.g. automated voice, and/or a vibration notification using a vibration element of the present device.

Note that a select selector element 708 is also shown which is selectable to automatically cause another UI to be presented for a user to establish a particular tone, tone magnitude, tone length, and/or tone type for tone notifications when activated using the respective check box 706 for tones. Also note that a select selector element 710 is shown which is selectable to automatically cause another UI to be presented for a user to establish a particular vibration magnitude, vibration length, and/or vibration pattern for vibration notifications when activated using the respective check box 706 for vibration.

The UI 700 also includes a second setting 712 pertaining to whether to configure the present device to provide notifications indicating whether a speaker phone feature is being used by another device with which the present device is engaging in a telephonic communication in accordance with present principles. A check box 714 is shown, which is selectable to configure the device to provide such notifications and is also un-selectable once selected configure the device to not provide such notifications. Check boxes 716 are also shown which are respectively associated with types of notifications for indicating use of a speaker phone feature at another device that may be presented at the present device, including e.g. a visual notification on a user interface, an audible notification using a tone, an audible notification using an e.g. automated voice, and/or a vibration notification using a vibration element of the present device.

Note that a select selector element 718 is also shown which is selectable to automatically cause another UI to be presented for a user to establish a particular tone, tone magnitude, tone length, and/or tone type for tone notifications of speaker phone feature use when activated using the respective check box 716 for tones. Also note that a select selector element 720 is shown which is selectable to automatically cause another UI to be presented for a user to establish a particular vibration magnitude, vibration length, and/or vibration pattern for vibration notifications of speaker phone feature use when activated using the respective check box 706 for vibration.

Without reference to any particular figure, it is to be understood that while the logic of FIGS. 3 and 4 were described as being executed by different devices e.g. such as on opposite ends of a two-way telephonic communication, it is to be understood that a single device may undertake logic of both FIGS. 3 and 4 to e.g. determine a number of people on the other end of a call and/or use of a speaker phone feature on the other end of a call, as well as to provide data pertaining to a number of people present at that device and/or use of a speaker phone feature at that device to the other device on the other end of the call as well.

Also without reference to any particular figure, it is to be understood that in addition to or in lieu of the notifications described above, still other notifications may be provided in accordance with present principles. E.g., a symbol indicative of the use of a speaker phone feature by another device may be presented on a telephone call user interface of a user's device that is typically presented for the particular device when engaging in a telephone call, as well as a symbol indicative of plural people being proximate to the other device and/or a number for indicating the actual number of people. As another example of a type of notification that may be provided, e.g. a number of tones may be provided and/or a number of vibrations may be provided may correspond to the number of people on the other end of the call. E.g., two "beeps" presented at the user's device would indicate that there are two people on the other end of the call (e.g. the person with whom the user is engaging in the telephonic communication and one other person that is proximate).

Describing the proximities discussed herein, a proximity in accordance with present principles may be determined various ways. E.g. the dimensions of a structure (e.g. room of a building or a vehicle) may be determined by a device undertaking present principles using e.g. data accessible to the device (e.g. floor plans, GPS data, etc.) as well as e.g. echo detection and data from a camera. A user may also establish and/or define such a proximity, including but not limited to indicating dimensions of a structure and/or establishing a threshold radius and/or box for the proximity.

Still without reference to any particular figure, it is to be understood that data in accordance with present principles may be transmitted between devices e.g. over a "back-end" of the telephonic communication link itself, as well as e.g. through separate networks such as a cellular data network or Wi-Fi connection.

A speaker phone feature in example embodiments may be e.g. a feature allowing a user to engage in a telephonic communication with another device while not holding their device at or near their ear and mouth but rather holding the device a distance away with an increased sound volume and microphone sensitivity being used by the device so that a user may still hear the telephonic communication and participate in it by speaking. Thus, it is to be understood that while in some embodiments present principles may be undertaken using e.g. a smart phone and/or phone application executing thereon, still other devices, applications, and/or communication methods (e.g. other audio/video communications) may be used in conjunction with a speaker phone feature such as e.g. tablet computers or personal computers that execute video and/or web conferencing applications and/or use voice over Internet protocol (VOIP) communication.

Further discussing the Bluetooth communication referenced above, note that in some embodiments data pertaining to a specific type of Bluetooth communication method and/or device may be transmitted between devices facilitating a telephonic communication. For instance, a Bluetooth speaker phone element may be arranged on a vehicle and communicate with a device when disposed therein specifically for engaging in telephonic communication using a speaker phone feature in which the vehicle's microphone and speakers are used, and such information may be transmitted to another phone to thus draw a conclusion with a relatively high level of confidence that a speaker phone feature is being used on the other end of the call. Such information may be presented e.g. using one of the notification methods described herein, (e.g. presented on a UI). Notwithstanding, it is to also be understood that should there be a Bluetooth device that is not identifiable, data transmitted to another device may at least indicate e.g. that the person is using another Bluetooth device but that it is not identifiable. This information may also be presented e.g. using one of the notification methods described herein (e.g. presented on a UI).

Again without reference to any particular figure, it is to be understood that different probabilities of numbers of people and use of a speaker phone function on the other end of a call may be provided to a user in accordance with present principles. For instance, if plural people and/or use of a speaker phone feature are determined with a high degree of accuracy to be present on the other end of the call, a "definitely public" notification may be provided, whereas if some data indicates as much but the device cannot determine with certainty that as much exists, a "probably public" notification may be provided. E.g., if the other device provides data indicating that a speaker phone feature is being used thereat, a "definitely public" notification may be provided. Notwithstanding, as another example, even if the other device transmits data indicating that a speaker phone feature is being used thereat but also transmits data indicating no other people besides the person engaging in the call using the other device is proximate to the other device, a "definitely private" notification may nonetheless still be provided (e.g. even if a notification is also provided indicating the use of the speaker phone feature). As but another example, if another device transmits data indicating the user of a third device for facilitating the telephonic communication (e.g. a Bluetooth device as set forth above) but for whatever reason the third device is not identifiable, a notification may be provided indicating a third device is being used but also indicating that it cannot be established what the third device is or whether it results in a "public" conversation where other people may potentially hear the communication.

It may now be appreciated that present principles provide for e.g. using an application installed on a device, and/or "built-in" to the device, to notify a user when there are multiple listeners on the other end of a telephone call. For example, if the user calls someone that is in a room or ear with Bluetooth communication being used between the other device and room or car, or with other people in the room or car, by e.g. using voice and/or presence detection the user's device may indicate the number of people in the room or car. Social networking services may also be used to gather data on who may be in the room or car.

Furthermore, by using sound distortion and/or echo detection, the device may determine whether it is operating in a speakerphone mode and provide a notification accordingly (e.g. on the device itself and also transmit the data to the other device with which it is engaged in a telephone call). E.g., using sound distortion and/or echo detection it may be determined how close e.g. a user's cheek is to the device and hence whether the user has the device in a handset mode or a speaker phone mode. For example, using echo detection, a relatively fast echo of a sound emission directed (e.g. orthogonally) away from a side of the device bearing its display would occur when the device is positioned close to the user's cheek as opposed to when it is e.g. in the user's hand. As another example, using sound distortion, the device may determine that there may be a relatively low amount of ambient noise and hence the device has been placed in a handset mode and juxtaposed against or near the person's cheek, whereas if the person were using the device in a speaker phone mode the device may detect a relatively higher amount of ambient noise and hence determine that the device is in a speaker phone mode.

In addition, because some of the detection methods discussed herein may employ statistics, a device (based on such statistics) can provide a notification as to how many people are nearby with e.g. an indication of the level of "confidence" of being accurate that the device has in the number of people it has identified. In any case, it is to be understood that in some embodiments a device facilitating a telephone call can, while facilitating the call, constantly and/or periodically (e.g. at predefined and/or user-determined intervals) scan for changes such as people entering and exiting a proximity and/or whether a device has been changed between a handset mode and speaker phone mode so that e.g. if somebody walks in the proximity, or the person changes to speaker phone, the device may promptly notify the user.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular TRANSMISSION OF DATA PERTAINING TO USE OF SPEAKER PHONE FUNCTION AND PEOPLE PRESENT DURING TELEPHONIC COMMUNICATION is herein shown and described in detail, it is to be understood that the subject matter which is encompassed by the present application is limited only by the claims.

What is claimed is:

1. A first device, comprising:
    a processor;
    a Bluetooth communication element in communication with the processor; and
    storage accessible to the processor and bearing instructions executable by the processor to:
    determine that plural individuals are within a proximity to the first device; and
    transmit, to a second device with which the first device is facilitating a telephonic communication, data at least comprising information pertaining to the existence of plural individuals within the proximity;

wherein the data further comprises information pertaining to the use of the Bluetooth communication element to at least in part facilitate the telephonic communication.

2. The first device of claim 1, wherein the instructions are further executable to:
   determine whether the first device is facilitating the telephonic communication at least in part using a speaker phone feature; and
   in response to a determination that the first device is facilitating the telephonic communication at least in part using the speaker phone feature, transmit to the second device data pertaining to the use of the speaker phone feature.

3. The first device of claim 2, wherein the data pertaining to the use of the speaker phone feature is data other than data of audio of the telephonic communication.

4. The first device of claim 1, comprising a proximity sensor, wherein the instructions are executable to determine a number of individuals within the proximity to the first device at least in part using the proximity sensor.

5. The first device of claim 1, comprising a sound transceiver, wherein the instructions are further executable to determine that plural individuals are within the proximity to the first device at least in part using the sound transceiver to detect at least one echo of sound emitted by the sound transceiver.

6. The first device of claim 1, wherein the instructions are executable to determine that plural individuals are within the proximity to the first device at least in part by processing sound distortions in the proximity.

7. The first device of claim 1, wherein the instructions are executable to determine that plural individuals are within the proximity to the first device at least in part based on data received at the first device from a vehicle, and wherein the data received at the first device from the vehicle comprises at least one of the group consisting of: data pertaining to whether a passenger airbag has been enabled, data pertaining to whether a passenger seatbelt has been engaged, data gathered by a camera of the vehicle, data pertaining to a current weight of the vehicle, data pertaining to a current weight distribution of the vehicle.

8. A method, comprising:
   determining that plural individuals are within a proximity to a first device; and
   transmitting, to a second device with which the first device is facilitating a telephonic communication, data at least comprising information pertaining to the existence of plural individuals within the proximity;
   wherein the data further comprises information pertaining to the use of a Bluetooth communication element to at least in part facilitate the telephonic communication.

9. The method of claim 8, comprising:
   determining whether the first device is facilitating the telephonic communication at least in part using a speaker phone feature; and
   in response to determining that the first device is facilitating the telephonic communication at least in part using the speaker phone feature, transmitting to the second device data pertaining to the use of the speaker phone feature.

10. The method of claim 9, wherein the data pertaining to the use of the speaker phone feature comprises data other than data of audio of the telephonic communication.

11. The method of claim 8, comprising:
    determining that plural individuals are within the proximity to the first device at least in part using a proximity sensor.

12. The method of claim 8, comprising:
    determining that plural individuals are within the proximity to the first device at least in part using a sound transceiver to detect at least one echo of sound emitted by the sound transceiver.

13. The method of claim 8, comprising:
    determining that plural individuals are within the proximity to the first device at least in part by processing sound distortions in the proximity.

14. The method of claim 8, comprising:
    determining that plural individuals are within the proximity to the first device at least in part based on data received from a vehicle, wherein the data received from the vehicle comprises at least one of the group consisting of: data pertaining to whether a passenger airbag has been enabled, data pertaining to whether a passenger seatbelt has been engaged, data gathered by a camera of the vehicle, data pertaining to a current weight of the vehicle, data pertaining to a current weight distribution of the vehicle.

15. A computer readable storage medium (CRSM) that is not a transitory signal, the CRSM comprising instructions executable by a processor to:
    determine that plural individuals are within a proximity to a first device; and
    transmit, to a second device with which the first device is facilitating a telephonic communication, data at least comprising information pertaining to the existence of plural individuals within the proximity;
    wherein the data further comprises information pertaining to the use of a Bluetooth communication element to at least in part facilitate the telephonic communication.

16. The CRSM of claim 15, wherein the instructions are executable to:
    determine whether the first device is facilitating the telephonic communication at least in part using a speaker phone feature; and
    in response to a determination that the first device is facilitating the telephonic communication at least in part using the speaker phone feature, transmit to the second device data pertaining to the use of the speaker phone feature.

17. The CRSM of claim 15, wherein the instructions are executable to determine that plural individuals are within the proximity to the first device at least in part using a proximity sensor.

18. The CRSM of claim 15, wherein the instructions are executable to determine that plural individuals are within the proximity to the first device at least in part using a sound transceiver to detect at least one echo of sound emitted by the sound transceiver.

19. The CRSM of claim 15, wherein the instructions are executable to determine that plural individuals are within the proximity to the first device at least in part by processing sound distortions in the proximity.

20. The CRSM of claim 15, wherein the instructions are executable to determine that plural individuals are within the proximity to the first device at least in part based on data received from a vehicle, and wherein the data received from the vehicle comprises at least one of the group consisting of: data pertaining to whether a passenger airbag has been enabled, data pertaining to whether a passenger seatbelt has been engaged, data gathered by a camera of the vehicle, data pertaining to a current weight of the vehicle, data pertaining to a current weight distribution of the vehicle.

* * * * *